(12) United States Patent
Fischer et al.

(10) Patent No.: US 11,420,486 B2
(45) Date of Patent: Aug. 23, 2022

(54) WHEEL RELEASE DETECTION

(71) Applicant: Continental Engineering Services GmbH, Frankfurt (DE)

(72) Inventors: Daniel Fischer, Frankfurt am Main (DE); Andreas Kulessa, Frankfurt am Main (DE)

(73) Assignee: Continental Engineering Services GmbH

( * ) Notice: Subject to any disclaimer, the term of this patent is extended or adjusted under 35 U.S.C. 154(b) by 217 days.

(21) Appl. No.: 16/936,835

(22) Filed: Jul. 23, 2020

(65) Prior Publication Data

US 2021/0023894 A1 Jan. 28, 2021

(30) Foreign Application Priority Data

Jul. 25, 2019 (DE) ...................... 10 2019 211 106.8

(51) Int. Cl.
*B60C 23/04* (2006.01)

(52) U.S. Cl.
CPC ...... *B60C 23/0488* (2013.01); *B60C 23/0474* (2013.01)

(58) Field of Classification Search
CPC combination set(s) only.
See application file for complete search history.

(56) References Cited

U.S. PATENT DOCUMENTS

| | | | |
|---|---|---|---|
| 2013/0008254 A1* | 1/2013 | Heim | G01M 13/045 |
| | | | 73/593 |
| 2016/0163131 A1* | 6/2016 | Steinlechner | B60C 9/00 |
| | | | 701/33.7 |
| 2018/0009429 A1 | 1/2018 | Hall et al. | |
| 2021/0125428 A1* | 4/2021 | Tedesco | G06N 20/00 |

FOREIGN PATENT DOCUMENTS

| | | | | |
|---|---|---|---|---|
| CN | 112384384 A * | 2/2021 | | B60C 23/06 |
| DE | 102015000998 A1 * | 7/2016 | | B60T 17/22 |
| DE | 102015000998 A1 | 7/2016 | | |
| DE | 102018212026 A1 * | 1/2020 | | B60C 23/06 |
| DE | 102020208711 A1 * | 5/2021 | | |
| EP | 1308320 A2 * | 5/2003 | | B60C 23/061 |
| WO | WO-2020192982 A1 * | 10/2020 | | B60B 3/16 |

* cited by examiner

*Primary Examiner* — Andre J Allen
(74) *Attorney, Agent, or Firm* — RatnerPrestia

(57) ABSTRACT

A method for determining an item of fastening information of a wheel of a motor vehicle, wherein rotational movements of the wheel are detected by at least one sensor. The sensor provides a wheel speed signal to an electronic control unit, which determines the fastening information from the wheel speed signal. A first time-frequency transformation of the wheel speed signal is carried out, whereby a first transformation signal is generated, after which a second time-frequency transformation of the first transformation signal is carried out. A second transformation signal is generated, in particular after which a first fastening parameter is obtained from the second transformation signal, after which the fastening information is calculated/determined as a function of the second transformation signal and/or the first fastening parameter.

15 Claims, 5 Drawing Sheets

WHEEL RELEASE DETECTION

CROSS REFERENCE TO RELATED APPLICATIONS

This application claims priority to German Patent Application No. 10 2019 211 106.8, filed Jul. 25, 2019, the contents of such application being incorporated by reference herein

FIELD OF THE INVENTION

The invention relates to a method for determining an item of fastening information of a wheel of a motor vehicle.

BACKGROUND OF THE INVENTION

Detecting a possible loosening of a wheel or a loosening of the fastening bolts of a wheel for safety reasons is known. For this purpose, sensor arrangements are known which determine forces or torques on the fastening bolt or the distance of the wheel from the wheel mount, i.e., whether an air gap forms. Alternatively, there are methods which make calculations based on the wheel speeds for this purpose, as disclosed, for example, in document DE102015000998 A1, incorporated herein by reference.

SUMMARY OF THE INVENTION

An aspect of the invention is a method which enables reliable and/or precise and/or cost-effective determination of an item of fastening information of a wheel.

The term fastening information is preferably understood as an item of wheel fastening information which identifies a loosened/fixed wheel and/or an acceptable air clearance/an acceptable air gap between wheel and wheel mount or not.

The first and the second transformation signal are expediently spectra or signals comprising items of spectral information.

The first and the second time-frequency transformation are preferably each carried out as a Fourier transform.

It is preferable for the first transformation signal to be subjected to a noise suppression, which is in particular designed/carried out in such a way that spectral vibration signal components of the drive train or the engine of the motor vehicle or the wheel, in case of a hub motor, are filtered out or significantly reduced.

The following is an expedient/exemplary explanation or definition of the wheel frequency, which is dependent on the velocity of the motor vehicle, and of the wheel harmonic or a wheel harmonic signal:

The wheel frequency $\omega$ is defined by the reciprocal of the time t that the wheel takes for its own revolution:

$$\omega = 1/t$$

Since the time for one revolution depends on the wheel velocity v, the following applies (with s for the wheel circumference):

$$\omega = 1/t = v/s,$$

that the wheel frequency also depends on the wheel velocity. The multiples (n times) of this wheel frequency are called (nth) wheel harmonics and can become visible in the frequency spectrum of the signal from the wheel speed sensor.

Example of a vehicle with a velocity of 50 km/h and a 17 inch tire (225/65 R17):

$$=> s=2.202 \text{ m}, v=13.88 \text{ m/s}$$

$$=> \omega_1=6.307 \text{ Hz}, \omega_2=2*6.307 \text{ Hz}=12.614 \text{ Hz},$$
$$\omega_3=3*6.307 \text{ Hz}=18.921 \text{ Hz etc.}$$

The wheel speed signal is preferably used in the scope of the method only for calculating/determining a fastening parameter or the fastening information if the motor vehicle does not exceed a defined acceleration, in particular the velocity varies by no more than +/−3 km/h or +/−5 km/h, expediently within a defined time interval and/or if the motor vehicle does not exceed a defined steering angle amount, in particular 10°, expediently within a defined time interval.

It is preferable that the fastening information is designed/defined as safety information with respect to a looseness of the wheel and/or with respect to the air clearance between the wheel suspension of the wheel and the wheel itself.

The first fastening parameter is preferably obtained from the second transformation signal as a function of a wheel harmonic.

It is expedient that when the first fastening parameter is obtained from the second transformation signal, exceeding at least one first threshold value in a frequency range is checked/computed, which is a function of the wheel harmonic, in particular essentially with respect to its average frequency and/or with respect to a frequency interval of essentially 1 Hz around the average frequency, and if this threshold value is exceeded, the first fastening parameter in particular has the information that the wheel is not properly fastened.

It is preferable that a corotating encoder is associated with the wheel to detect the rotational movements of the wheel, which encoder has circumferential graduations, in particular north-south pole pairs or tooth-gap pairs, wherein the graduations each have a division error with which the respective graduation differs from an ideal, identically uniform formation of the circumferential graduations arranged with respect to the encoder, wherein the division errors of each graduation are stored in the electronic control unit and/or in the sensor, wherein
the sensor detects the rotational movements of the encoder and the electronic control unit calculates a second fastening parameter as a function of the variance of the detected graduations and/or the graduation division errors and/or the graduation division error correction factors and/or the graduation transitions and the fastening information is obtained as a function of the first and the second fastening parameter.

It is expedient that the detected graduations essentially correspond to the time interval of pulses of the wheel speed signal, wherein these pulses are generated in the sensor in the case of a detected north-south or tooth-gap transition of an encoder rotating with the wheel.

It is expedient that if the variance exceeds a defined threshold value in each case with a defined minimum number of graduations, the second fastening parameter has the information that the wheel is not properly fastened.

It is preferable that the graduation errors and/or graduation correction factors are recalculated and stored after the actuation of the ignition of the motor vehicle and/or after every detected standstill of the vehicle, in particular before an item of fastening information is calculated the first time after this actuation of the ignition.

It is expedient that a first filtering is applied to the first transformation signal and a second filtering is applied in parallel, wherein an essentially periodic wheel harmonic signal dependent at least on a wheel harmonic is filtered out spectrally in the first or second filtering, after which a subtraction of the two spectra after the first and second filtering is carried out, after which the different spectrum is subjected to the second time-frequency transformation, after which the first fastening parameter is calculated as a function of the second transformation signal.

It is preferable that in the course of the first and the second filtering, the drive train signals with respect to the vibrations of the drive train of the motor vehicle are at least partially filtered out spectrally, and/or that after the first and second filtering and before the subtraction, the filtered spectra are subjected to a chronological filtering, in particular an averaging over a defined time/value sequence interval.

It is expedient that the method uses signals and/or calculation results which are provided by an indirect tire pressure loss detection method, which uses as input variables a wheel speed signal and in particular a vertical acceleration signal and/or a longitudinal acceleration signal with respect to the wheel and/or motor vehicle.

An aspect of the invention additionally relates to a sensor arrangement, comprising at least one sensor, in particular a wheel speed sensor, which detects the rotational movements of an encoder corotating with a wheel and provides its wheel speed signal to an electronic control unit, wherein the sensor and the electronic control unit are configured to carry out the method according to the invention.

LIST OF REFERENCE SIGNS 1, 2 first and second method branch
3 provision of the wheel speed signal under conditions
4 first time-frequency transformation
5 noise suppression
6 second time-frequency transformation
7 signal peak detection
8 calculation of a fastening parameter
9 calculation of graduation error correction factors
10 calculation of variance of the graduation error correction factors
11 calculation of whether/which of the graduation error correction factors exceed a defined threshold
12 check of how many of these graduation error correction factors have exceeded the defined limit value 12,
13 calculation of the second fastening parameter
14 plausibility check as a function of the first and second fastening parameters
15 decision as to whether the risk of a loose wheel exists/is acute
16, 18 filtering of first method branch, comprising suppression of a wheel harmonic signal
17, 19 filtering of second method branch
20 subtraction of the two spectra after the first and second filtering
b distance of graduation to adjacent graduation
A wheel speed signal
B first transformation signal
C second transformation signal
D first fastening parameter
E second fastening parameter
F fastening information

BRIEF DESCRIPTION OF THE DRAWINGS

In the schematic figures

DETAILED DESCRIPTION OF THE PREFERRED EMBODIMENTS

Figure 4:
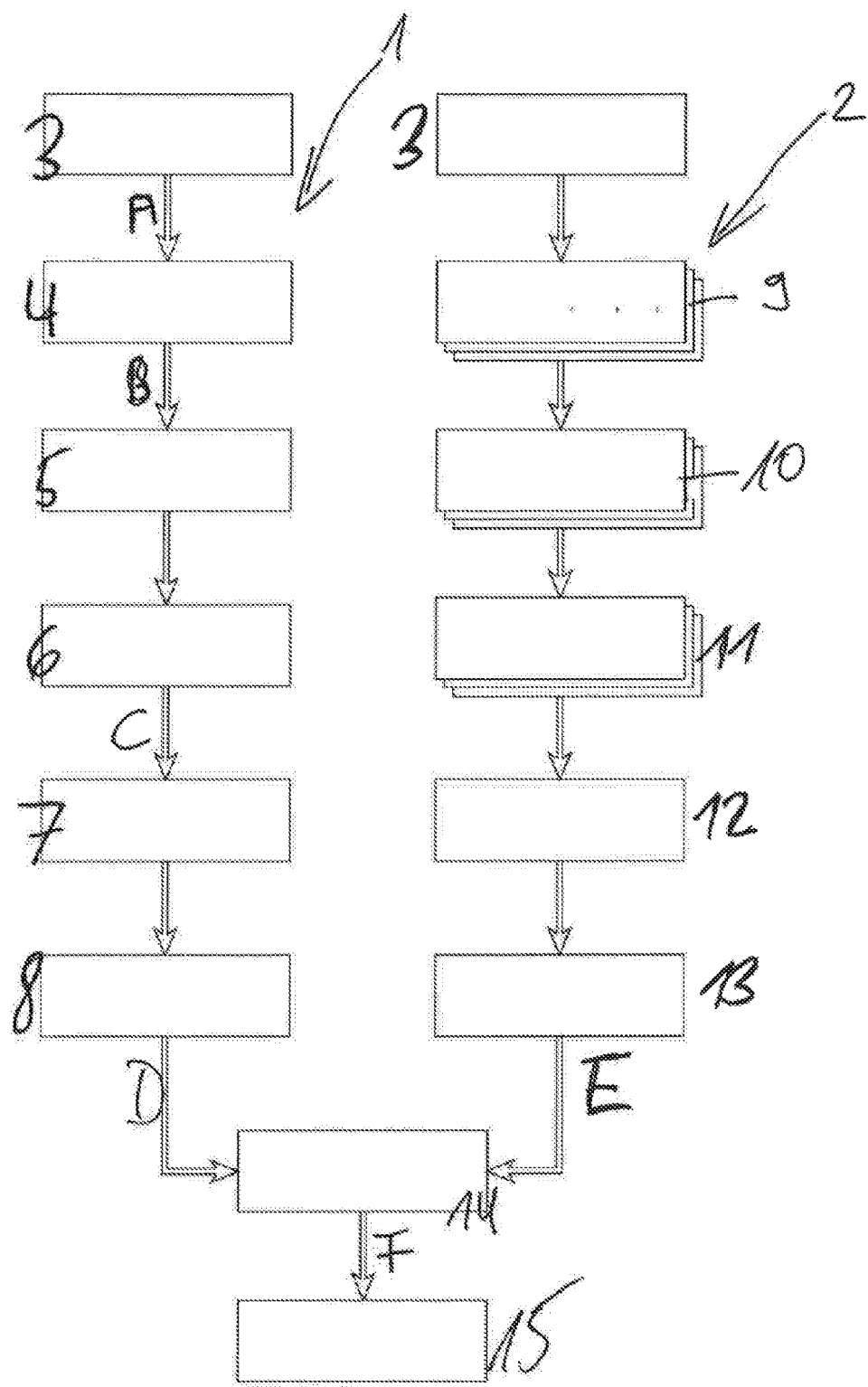
FIG. 4 shows a flowchart of an exemplary embodiment of the method in which a first fastening parameter is calculated in a first method branch by means of a double time-frequency transformation and a second fastening parameter is calculated in a second method branch by calculating the variance of graduation error correction factors.

An exemplary method is illustrated in FIG. 4, in which a first and a second fastening parameter are calculated in two different ways, after which the fastening information is calculated on the basis of these two fastening parameters. In each of the method branches 1, 2, which each result in a fastening parameter, firstly the wheel speed signal A is provided to the method under specific conditions 3, which is dependent on the movement of the associated wheel. According to the example, the wheel speed signal is continuously provided when the ignition is activated and is only used if a defined acceleration of the motor vehicle is not exceeded and the amount of a defined steering angle is not exceeded.

In the first method branch 1, a fastening parameter is calculated by means of a double time-frequency transformation. First, a first time-frequency transformation 4, for example a Fourier transform, is carried out, as a result of which a first transformation signal B is generated, which comprises items of information from a spectrum. The transformation signal B is then subjected to a noise suppression 5, which is in particular designed/carried out in such a way that spectral vibration signal components of the drive train, for example, above all of the engine, are filtered out or significantly reduced.

The second time-frequency transformation 6, for example also a Fourier transform, is then carried out, as a result of which a second transformation signal C is generated, which also comprises items of information from a spectrum. A signal peak detection 7 is then carried out, whereby a fastening value is determined each time a defined signal threshold is exceeded, wherein each fastening value has, for example, an item of information of a probability that or whether the associated wheel is loose/loosened. The first fastening parameter D is calculated 8 as a function of the fastening values. Averaging over time can also be carried out for this purpose.

In the second method branch, a graduation error or a graduation error correction factor is calculated 9 from the wheel speed signal A per graduation detected by the sensor of the encoder rotating with the wheel, which error is a function of time intervals between the wheel speed pulses of the wheel speed signal, wherein the pulses are each generated by the sensor due to a detected graduation, wherein this graduation error correction factor is a function, for example, of the time intervals between the wheel speed pulses of the wheel speed signal with filtering or essential filtering/consideration of the acceleration of the motor vehicle. After each start/driving off of the motor vehicle, the graduation errors or graduation error correction factor are stored in succession in the electronic control unit. The currently detected and calculated values of the graduation error correction factors are then each compared to these stored values and/or the variance of these values is calculated 10. It is then checked or calculated whether/which of these values exceed a defined threshold value and, for example, also how large the excess is 11. It is then checked how many of these values have exceeded 12 the defined limiting value for graduation error correction factors, after which the second fastening parameter E is calculated 13 as a function of the number of these limiting value excesses or additionally as a function of the items of information about how large the respective excess was.

A plausibility check is then carried out as a function of the first and second fastening parameter D, E and the fastening information F is calculated 14, which comprises an item of information as to whether or with which probability the associated wheel is loose, has an excessively large air gap/excessively large distance between wheel mount and wheel, for example, because multiple wheel bolts are loose or do not fix the wheel adequately. On the basis of the fastening information F, it is decided 15 whether the risk of a loose wheel exists/is acute, after which a warning is given to the driver, for example, via a warning light or a visual warning in a display and an acoustic warning, or not.

Method steps 4 to 15 are carried out in an electronic control unit ECU, for example the brake control unit or the airbag control unit.

Figure 1A:
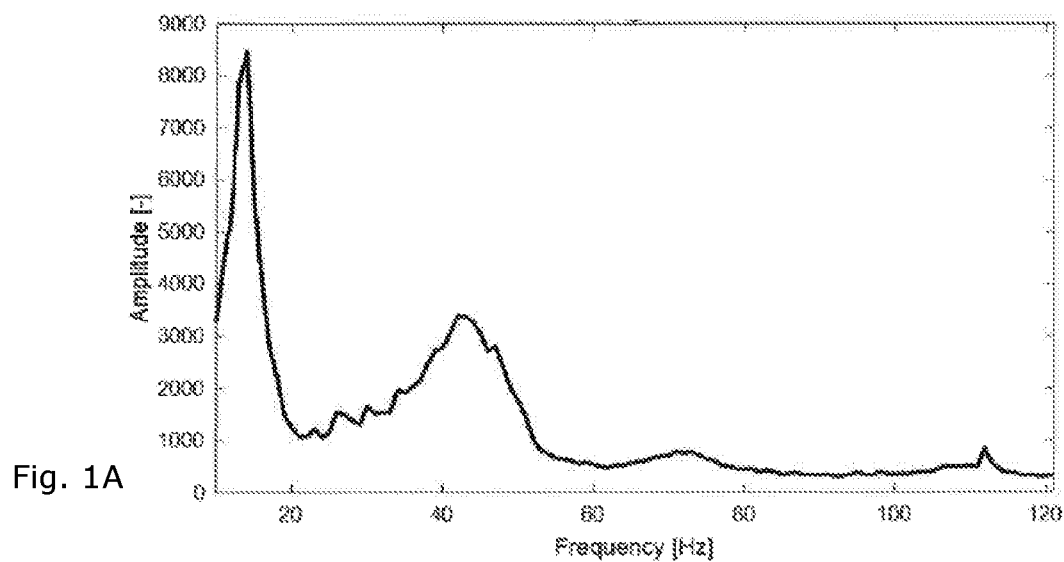
FIGS. 1A and 1B show two examples of a first transformation signal, FIG. 1A a fixed wheel and FIG. 1B a loose wheel.
Figure 1B:
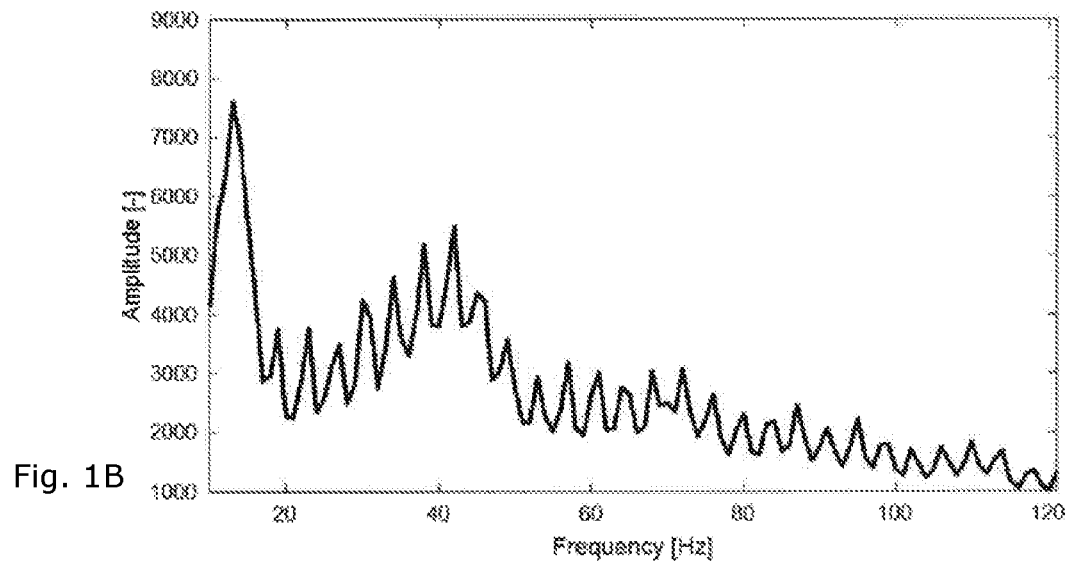
Figure 2A:
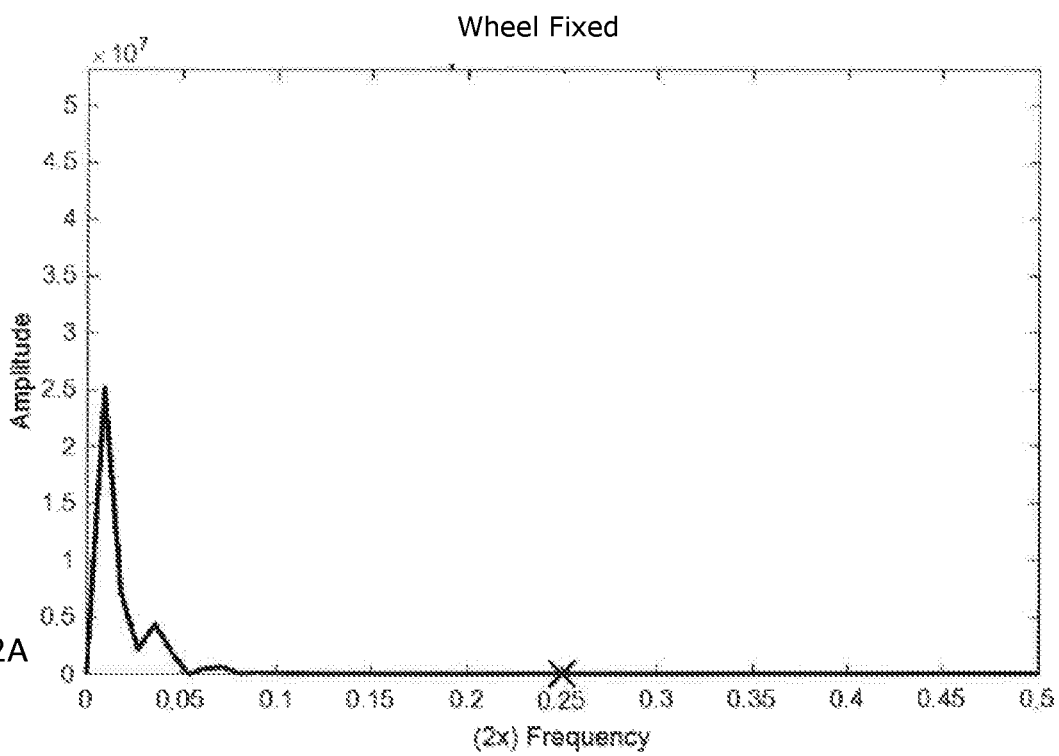
FIGS. 2A and 2B show two examples of a second transformation signal, FIG. 2A a fixed wheel and FIG. 2B a loose wheel.
Figure 2B:
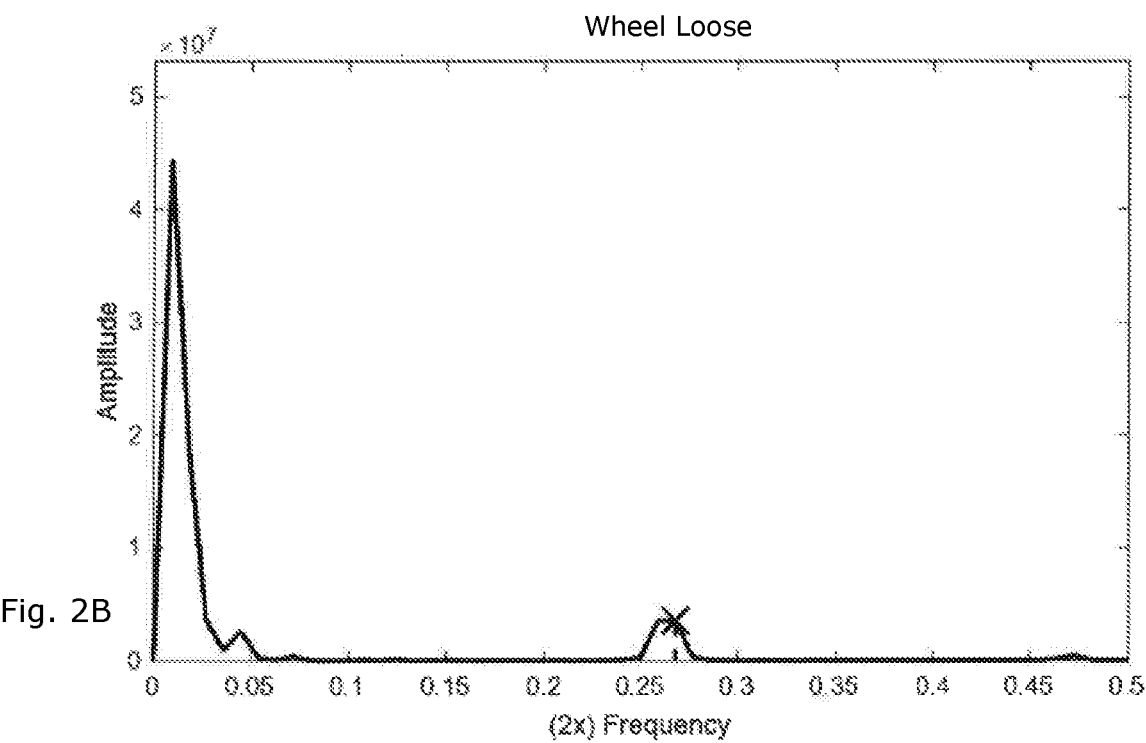
Figure 3A:
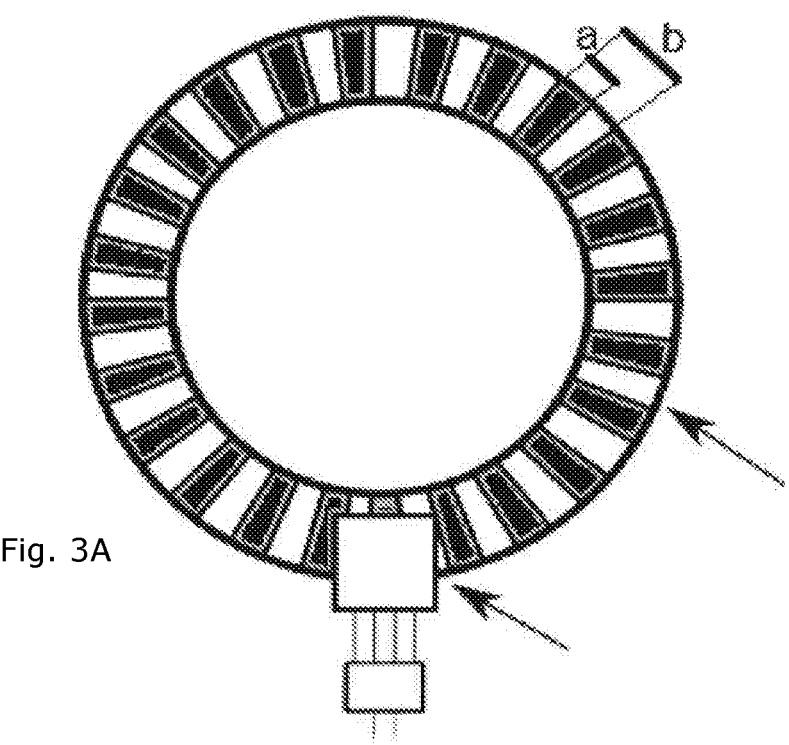
FIG. 3A shows an exemplary sensor arrangement having a magnetic encoder and a wheel speed sensor.

A calculation will be carried out for better comprehension as an example for the second method branch 2 from FIG. 4:

The sensor arrangement consists of a magnet wheel or a magnetic encoder having N poles or graduations and a wheel speed sensor which detects the encoder or its movements, as illustrated with the aid of FIG. 3A. In theory, each pole or each graduation i is, in relation to its directly adjacent poles or graduations, at the distance $$b_i = \frac{U}{N}$$

wherein it is measured from pole beginning to pole beginning or from beginning of a graduation to the beginning of an adjacent graduation and U is the total circumference of the encoder. In practice, the magnet wheel or the encoder has manufacturing tolerances which are described by a correction factor $c_i$:

$$b_i = c_i \cdot \frac{U}{N}$$

The velocity for a pole results from $$v_i = \frac{b_i}{t_i}$$

and the velocity for a full revolution of the encoder from $$v = \frac{U}{\sum_{-N/2}^{N/2} t_j}$$

Assuming that $v = v_i$ applies on average, the correction factor or graduation correction factor is obtained $$c_i = \frac{t_i}{\frac{1}{N} \sum_{-N/2}^{N/2} t_j}$$

Figure 3B:
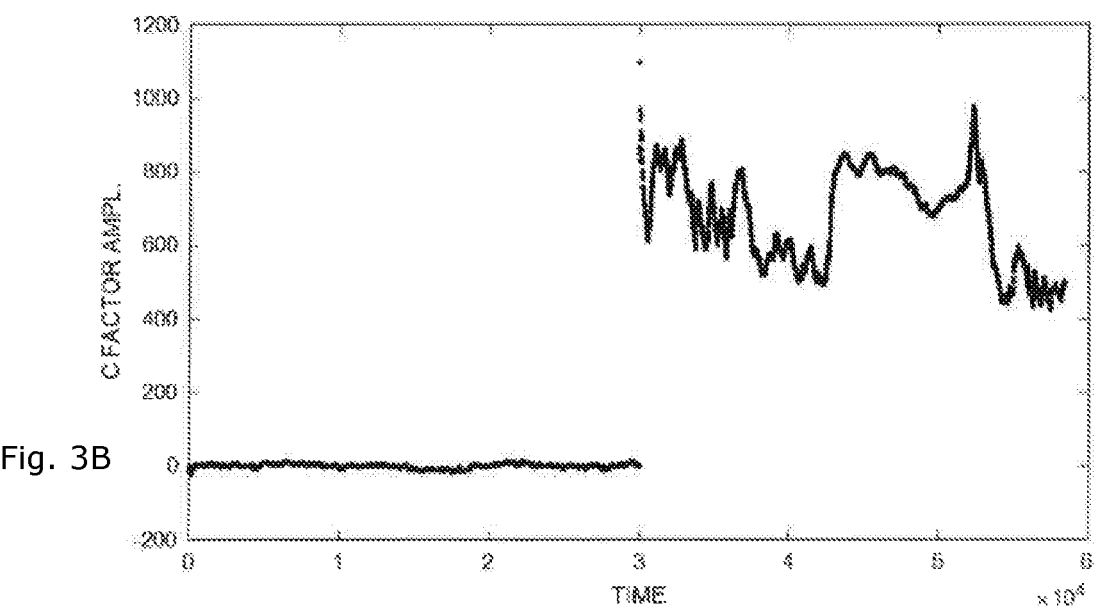
FIG. 3B shows exemplary graduation correction factors for a fixed and a loose wheel.

This graduation correction factor is determined for each pole i in operation of the motor vehicle, see for example in FIG. 3B the amplitude of a C factor over time, and has a typical noise behavior in normal operation, see left signal region of FIG. 3B. With a loose wheel, this noise is significantly higher in the case of many magnet wheels. A loose wheel is thus detected, see right signal region of FIG. 3B. One possible embodiment of the noise detection is the determination of the variance. In the example, the variance increases from 36 to 17161.

The results of the two modules are checked against one another for plausibility, for example. If a loose wheel is detected, the driver is informed. As soon as the problem has been resolved, the algorithm detects this and the warning to the driver is deactivated again.

Figure 5:
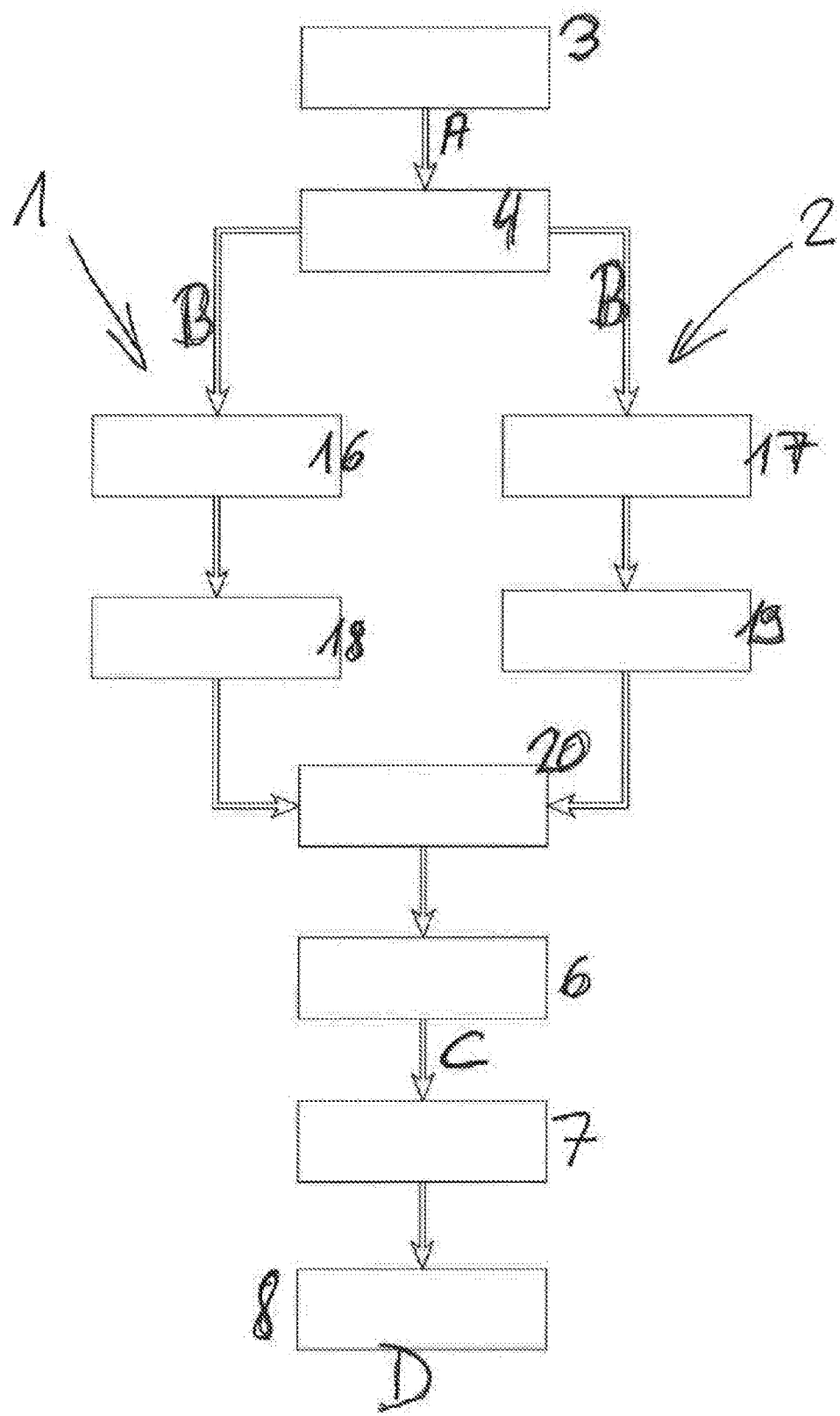
FIG. 5 shows a flowchart of an alternative exemplary embodiment for the above-mentioned first method branch, in which different filtering takes place in two (further sub) method branches after a respective first time-frequency transformation, after which a spectral difference spectrum is formed which is subjected to the second time-frequency transformation.

An alternative example for method branch 1 in FIG. 4 is illustrated on the basis of FIG. 5.

Firstly the wheel speed signal A is also provided here to the method under specific conditions 3, which is dependent on the movement of the associated wheel. According to the example, the wheel speed signal is continuously provided when the ignition is activated and is only used if a defined acceleration of the motor vehicle is not exceeded and the amount of a defined steering angle is not exceeded.

Then, a first time-frequency transformation 4, for example a Fourier transform, is carried out, as a result of which a first transformation signal B is generated, which comprises items of information from a spectrum.

A first filtering 16, 18 is then applied to the first transformation signal B in a first method branch 1 and a second filtering 17, 19 is applied in parallel in a second method branch 2, wherein in the case of the first filtering 16, at least one essentially periodic wheel harmonic signal spectrally dependent at least on a wheel harmonic is filtered out and in addition the drive train signals with respect to the vibrations of the drive train of the motor vehicle are additionally spectrally at least partially filtered out. In the second filtering 17, the drive train signals with respect to the vibrations of the drive train of the motor vehicle are also spectrally at least partially filtered out, but not the wheel harmonic signal. In each of these branches, a different chronological filtering 18, 19, for example, in particular an averaging over a defined time/value sequence interval, is then carried out.

Subtraction 20 of the two spectra after the first and second filtering, i.e., the first and second method branch, is then carried out, after which the difference spectrum is subjected to the second time-frequency transformation 6.

A signal peak detection 7 is then carried out as a function of the second transformation signal C, whereby a fastening value is determined each time a defined signal threshold is exceeded, wherein each fastening value has, for example, an item of information of a probability that or whether the associated wheel is loose/loosened. As a function of the fastening values, the first fastening parameter D is calculated 8, from which the fastening information of the corresponding wheel is calculated.

The invention claimed is:

1. A method for determining an item of fastening information of a wheel of a motor vehicle, the method comprising:
   detecting rotational movements of the wheel by at least one sensor, wherein the sensor provides a wheel speed signal to an electronic control unit, which determines the fastening information from the wheel speed signal,
   carrying out a first time-frequency transformation of the wheel speed signal, whereby a first transformation signal is generated,
   after which carrying out a second time-frequency transformation of the first transformation signal, whereby a second transformation signal is generated,
   after which obtaining a first fastening parameter from the second transformation signal, and
   after which calculating/determining the fastening information as a function of the second transformation signal and/or the first fastening parameter.

2. The method as claimed in claim 1, wherein the fastening information is designed/defined as safety information with respect to a looseness of the wheel and/or with respect to an air clearance between wheel suspension of the wheel and the wheel itself.

3. The method as claimed in claim 1, wherein the first fastening parameter is obtained from the second transformation signal as a function of a wheel harmonic.

4. The method as claimed in claim 3, wherein when the first fastening parameter is obtained from the second transformation signal, exceeding at least one first threshold value in a frequency range is checked/computed, which is a function of the wheel harmonic, with respect to its average frequency and/or with respect to a frequency interval of 1 Hz around the average frequency, and if this threshold value is exceeded, the first fastening parameter has the information that the wheel is not properly fastened.

5. The method as claimed in claim 1, wherein a corotating encoder is associated with the wheel to acquire the rotational movements of the wheel, which encoder has circumferential graduations, in north-south pole pairs or tooth-gap pairs,
   wherein the graduations each have a division error with which the respective graduation differs from an ideal, identically uniform formation of the circumferential graduations arranged with respect to the encoder,
   wherein the division errors of each graduation are stored in the electronic control unit and/or in the sensor,
   wherein the sensor detects the rotational movements of the encoder and the electronic control unit calculates a second fastening parameter as a function of a variance of the detected graduations and/or the graduation division errors and/or the graduation division error correction factors and/or the graduation transitions and the fastening information is obtained as a function of the first and the second fastening parameter.

6. The method as claimed in claim 5, wherein the detected graduations essentially correspond to the time interval of pulses of the wheel speed signal, wherein these pulses are generated in the sensor in the case of a detected north-south or tooth-gap transition of an encoder rotating with the wheel.

7. The method as claimed in claim 5, wherein if the variance exceeds a defined threshold value in each case with a defined minimum number of graduations, the second fastening parameter has the information that the wheel is not properly fastened.

8. The method as claimed in claim 5, wherein the graduation errors and/or graduation correction factors are recalculated and stored after actuation of ignition of the motor vehicle and/or after every detected standstill of the vehicle, before an item of fastening information is calculated the first time after this actuation of the ignition.

9. The method as claimed in claim 1, wherein a first filtering is applied to the first transformation signal and a second filtering is applied in parallel, wherein a periodic wheel harmonic signal dependent at least on a wheel harmonic is filtered out spectrally in the first or second filtering, after which a subtraction of the two spectra after the first and second filtering is carried out, after which a different spectrum is subjected to the second time-frequency transformation, after which the first fastening parameter is calculated as a function of the second transformation signal.

10. The method as claimed in claim 9, wherein, in the course of the first and the second filtering, the drive train signals with respect to the vibrations of the drive train of the motor vehicle are at least partially filtered out spectrally, and/or after the first and second filtering and before the subtraction, the filtered spectra are subjected to a chronological filtering, in an averaging over a defined time/value sequence interval.

11. The method as claimed in claim 1, wherein the method uses signals and/or calculation results which are provided by an indirect tire pressure loss detection method, which uses as input variables a wheel speed signal and a vertical acceleration signal and/or a longitudinal acceleration signal with respect to the wheel and/or motor vehicle.

12. A sensor arrangement, comprising at least a wheel speed sensor, which detects rotational movements of an encoder corotating with a wheel and provides its wheel speed signal to an electronic control unit, wherein the wheel speed sensor and the electronic control unit are configured to carry out the method as claimed in claim 1.

13. The method as claimed in claim 2, wherein the first fastening parameter is obtained from the second transformation signal as a function of a wheel harmonic.

14. The method as claimed in claim 6, wherein the graduation errors and/or graduation correction factors are recalculated and stored after actuation of ignition of the motor vehicle and/or after every detected standstill of the vehicle, before an item of fastening information is calculated the first time after this actuation of the ignition.

15. The method as claimed in claim 7, wherein the graduation errors and/or graduation correction factors are recalculated and stored after actuation of ignition of the motor vehicle and/or after every detected standstill of the vehicle, before an item of fastening information is calculated the first time after this actuation of the ignition.

* * * * *